United States Patent
Squires

(10) Patent No.: US 9,512,950 B1
(45) Date of Patent: Dec. 6, 2016

(54) METHOD AND APPARATUS FOR UNIFORMITY OF SPILLS FROM FLUID-ENTRY FACES OF A PANEL BED

(71) Applicants: Arthur M. Squires Irrevocable Trust, Blacksburg, VA (US); Steven Critchfield, Blacksburg, VA (US)

(72) Inventor: Arthur M. Squires, Blacksburg, VA (US)

(73) Assignee: Arthur M. Squires Irrevocable Trust, Pulaski, VA (US)

( * ) Notice: Subject to any disclaimer, the term of this patent is extended or adjusted under 35 U.S.C. 154(b) by 417 days.

(21) Appl. No.: 13/731,478

(22) Filed: Dec. 31, 2012

Related U.S. Application Data

(60) Provisional application No. 61/581,191, filed on Dec. 29, 2011.

(51) Int. Cl.
*B01D 24/46* (2006.01)
*B01D 46/30* (2006.01)
*F16L 55/00* (2006.01)

(52) U.S. Cl.
CPC .............. *F16L 55/00* (2013.01); *B01D 24/46* (2013.01); *B01D 46/30* (2013.01)

(58) Field of Classification Search
None
See application file for complete search history.

(56) References Cited

U.S. PATENT DOCUMENTS

| | | | | |
|---|---|---|---|---|
| 1,095,676 A | * | 5/1914 | Rigg | 95/274 |
| 2,287,983 A | * | 6/1942 | Gavett | 210/786 |
| 4,000,066 A | | 12/1976 | Squires | |
| 4,004,350 A | * | 1/1977 | Squires | 34/506 |
| 4,374,652 A | * | 2/1983 | Zahedi et al. | 95/69 |
| 4,764,107 A | * | 8/1988 | Sundermann et al. | 432/96 |
| 6,783,326 B2 | | 8/2004 | Weitkamp | |
| 6,783,572 B1 | * | 8/2004 | Squires | 95/274 |

(Continued)

OTHER PUBLICATIONS

K.-C. Lee, R. Pfeffer, A. M. Squires, Granular-bed filtration assisted by filter-cake formation: 1. Exploiting a new form of soil failure for renewal of filtration surfaces in a panel bed, Powder Technology, 2005, pp. 5-16, vol. 155.

(Continued)

*Primary Examiner* — Bobby Ramdhanie
*Assistant Examiner* — Jonathan Peo
(74) *Attorney, Agent, or Firm* — James Creighton Wray; Meera P. Narasimhan

(57) ABSTRACT

The instant invention achieves uniformity of spills of granular material from fluid-entry faces of a panel bed by fixing the bed's position in space, and providing a constant push in a vertical direction on a deflector (preferably downward), the deflector moving in contact with the panel bed's fluid-exit wall when the bed is employed for filtration or countercurrent contacting. The constancy of the push causes the deflector's motion to occur at a constant combination of speed and displacement of the fluid-exit wall toward the fluid-entry faces of the panel bed, the combination causing a body movement of the granular material toward the fluid-entry faces, thereby causing spills of granular material to occur from the faces, renewing the faces. The constancy of the combination in the deflector's motion guarantees that the spills are uniform.

20 Claims, 6 Drawing Sheets

(56) References Cited

U.S. PATENT DOCUMENTS 7,815,717 B1 * 10/2010 Squires ........................... 95/108

OTHER PUBLICATIONS

I. Rodon, K.-C. Lee, A. M. Squires, O. K. Sonju, Granular-bed filtration assisted by filter-cake formation: 2. The panel bed gas filter with puffback renewal of gas-entry surface, Powder Technology, 2005, pp. 52-61, vol. 155.
A. M. Squires, Granular-bed filtration assisted by filter-cake formation: 4. Advanced designs for panel-bed filtration and gas treating, Powder Technology, 2005, pp. 74-84, vol. 155.
J.-S. Yang, D. R. Whitmire, A. M. Squires, Granular-bed filtration assisted by filter-cake formation: 5. Treating a liquid in a panel bed with pulseback renewal of liquid-entry granular-bed faces, Powder Technology, 2005, pp. 134-138, vol. 155.

* cited by examiner

METHOD AND APPARATUS FOR UNIFORMITY OF SPILLS FROM FLUID-ENTRY FACES OF A PANEL BED

This application claims the benefit of U.S. Provisional Application No. 61/581,191, filed Dec. 29, 2011, which is hereby incorporated by reference in its entirety as if fully set forth herein.

FIELD OF THE INVENTION

The invention relates to the renewal of fluid-entry faces in a panel bed of a loose granular solid material employed for intimate contacting of fluid and the solid material, e.g., to physically treat the fluid or the granular solid (or both of these); to filter fine particulate matter ("dirt" or "dust") from the fluid; to effect a chemical change in fluid or solid; to remove a chemical constituent of the fluid by absorption, adsorption, or chemical reaction; to heat a cold fluid by contact with a hot solid; to heat a solid by contact with a hot fluid. Renewal of fluid-entry faces is accomplished by creating a body movement of the granular solid toward the faces, causing a spill of the granular solid to occur from each of the faces, renewing the faces.

BACKGROUND OF THE INVENTION

U.S. Pat. No. 6,783,326 (Aug. 31, 2004), which the instant application incorporates by reference, broadly discusses two significant uses of a panel bed of granular material: (1) for filtering a dusty gas, the filtration being assisted by an accumulation of dust deposits (filter cakes) upon fluid-entry faces of the granular material; (2) for countercurrent contacting of the granular material with a gas. See "Granular-bed filtration assisted by filter-cake formation: 1. Exploiting a new form of soil failure for renewal of filtration surfaces in a panel bed," K.-C. Lee, R. Pfeffer, A. M. Squires, *Powder Technology*, vol. 155, 5-16, 2005; "2, The panel bed gas filter with puffback renewal of gas-entry surface," I. Rodon, K.-C. Lee, A. M. Squires, O. K. Sonju, *Powder Technology*, vol. 155, 52-61, 2005; and "4. Advanced designs for panel-bed filtration and gas treating," A. M. Squires, *Powder Technology*, vol. 155, 74-84, 2005. The referenced patent discloses means for renewing gas-entry faces of a panel bed of a granular material in which vertically disposed louvers (resembling slats of a Venetian blind) support the material: i.e., to provide a "reverse" surge flow of gas toward the gas-entry faces (a "puffback"). This surge flow produces a body movement of the granular material toward the faces, spilling moieties of the material from the faces and concomitantly exposing previously underlying material, thereby renewing the faces.

U.S. Pat. No. 4,000,066 (Dec. 28, 1976) broadly discusses two additional significant uses of a panel bed of granular material: (1) for filtering powdery matter from a liquid, the filtration being assisted by an accumulation of powdery matter deposits (filter cakes) upon liquid-entry faces of the granular material; (2) for countercurrent contacting of the granular material with a liquid. See "Granular-bed filtration assisted by filter-cake formation: 5. Treating a liquid in a panel bed with pulseback renewal of liquid-entry granular-bed faces," J.-S. Yang, D. R. Whitmire, A. M. Squires, *Powder Technology*, vol. 155, 134-138, 2005. The referenced patent discloses means for renewing liquid-entry faces of a panel bed of a granular material in which vertically disposed louvers (resembling slats of a Venetian blind) support the material: i.e., to provide a "reverse" surge flow of liquid toward the liquid-entry faces (a "pulseback"). This surge flow produces a body movement of the granular material toward the faces, spilling moieties of the material from the faces and concomitantly exposing previously underlying material, thereby renewing the faces.

SUMMARY OF THE INVENTION

Tests of both puffback and pulseback of relatively tall panel beds have shown acceptably small variation in spills of granular material from gas-treating or liquid-treating panel beds fluid-entry faces, respectively, the variation being acceptable for some applications of these devices. However, absolute uniformity of spill can improve a panel bed's performance, both for filtration and countercurrent contacting applications.

The instant invention achieves such uniformity by fixing the position of a panel bed in space, and providing a constant push in a vertical direction on a deflector (preferably downward), the deflector moving in contact with the panel bed's fluid-exit wall when the bed is employed for filtration or countercurrent contacting. The constancy of the push causes the deflector's motion to occur at a constant combination of speed and displacement of the fluid-exit wall toward the fluid-entry faces of the panel bed, the combination causing a body movement of the granular material toward the fluid-entry faces, thereby causing spills of granular material to occur from the faces, renewing the faces. The constancy of the combination in the deflector's motion guarantees that the spills are uniform.

The inventor was surprised to discover that the foregoing arrangement has an important concomitant advantage. When puffback or pulseback is employed to renew fluid-entry faces of a panel bed, the height of these faces is limited, generally speaking, to about ⅝ inch. A greater height causes face renewal to be accompanied by excessive loss of granular matter from an interior region adjacent to the upper edge of a fluid-entry face. Danger of such loss limits the allowable vertical distance separating adjacent louvers of the panel bed. Furthermore, even with an appropriate limitation in the height of fluid-entry faces, a puffback or pulseback spill does not derive evenly across a fluid-entry face; more of the spill originates from the upper region of the face than from the lower. In contrast, with the new arrangement, the height of a fluid-entry face can be made much larger. Accordingly, in comparison with a panel bed employing puffback or pulseback for fluid-entry face renewal, adjacent louvers supporting fluid-entry faces in a design for the instant invention can be further apart (e.g., as much as 3 inches apart) and therefore fewer in number and less costly to supply.

These and further and other objects and features of the invention are apparent in the disclosure, which includes the above and ongoing written specification, with the claims and the drawings.

BRIEF DESCRIPTION OF THE DRAWINGS

The invention will be more particularly described in conjunction with the following drawings, wherein.

DETAILED DESCRIPTION

Figure 1:
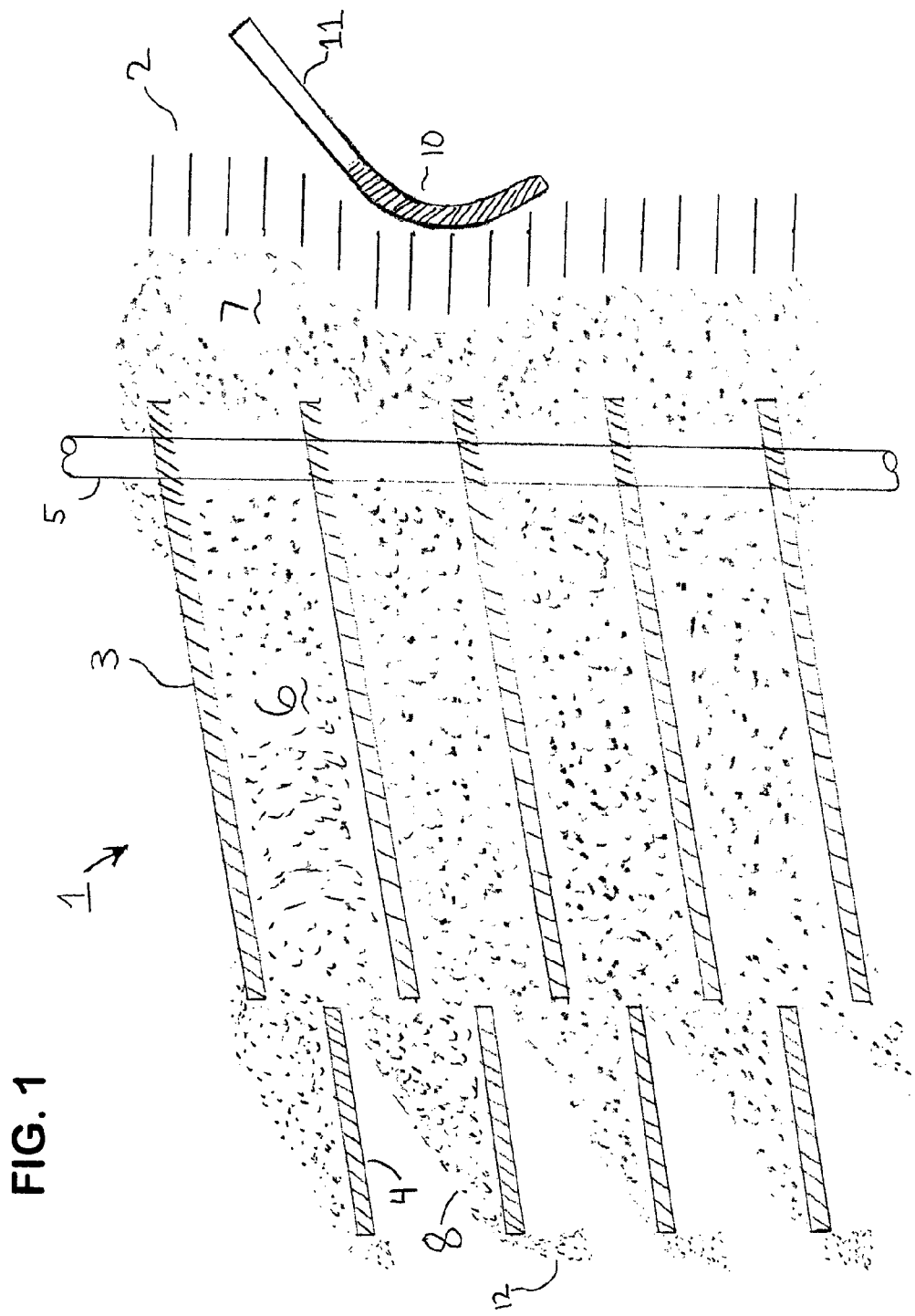
FIG. 1 shows a deflector moving down the fluid-exit wall of a panel bed.

In all the figures, like reference numerals refer to like parts having like functions. FIG. 1 depicts panel bed 1 of a granular material. In normal operation of bed 1, fluid for treatment enters panel bed 1 via a plurality of fluid-entry faces 8, supported by plates 4. Treated fluid leaves bed 1 via wall 2, which resembles a miniature subway grating. The distance between two adjacent platelets of wall 2 should be six times the diameter of the smallest particles with a significant presence in the granular material charged to bed 1.

If, as is often the case, the material has been prepared by screening, particles have been rejected that are too large to pass through a large screen; particles have also been rejected if too small to be retained by a small screen. If granular material for bed 1 has been prepared in this manner, the smallest particle "with a significant presence" is the smallest particle retained by the small screen. If the separation between adjacent platelets is six times the diameter of this particle, passage of granular material through wall 2 during normal operation of panel bed 1 is acceptably small.

In bed 1, plates 3 support zones 6, for countercurrent contacting between granular material and fluid entering via faces 8. Those skilled in the art will understand that in normal operation of bed 1 a reaction front moves through each zone 6 (from left to right in the drawing of FIG. 1). Post 5 is one of several identical posts that fix the panel bed in space.

When reaction fronts in zones 6 approach space 7, further operation of panel bed 1 requires spills 12 of granular material, thereby moving reaction fronts in zones 6 toward fluid-entry faces 8. Spills 12 occur when deflector 10 moves down wall 2 along a trajectory well inside the normal position of wall 2, thereby deflecting the wall toward fluid-entry faces 8. Losses of granular material via spills 12 move material from space 7 into spaces 6.

The drawing shows an arrangement for moving deflector 10 downward; i.e., by downward motion of bar 11 (receiving a downward shove from a source not shown in FIG. 1). Deflector 10 penetrates wall 2 of panel bed 1, moving the wall toward its fluid-entry faces 8. The motion creates a body movement of granular material in zone 6 toward fluid-entry faces 8, producing spills 12 from the faces.

Deflector 10 in FIG. 1 is a shallowly bent metal plate, rather like a gutter, extending perpendicularly to the drawing in FIG. 1. Its convex side presses against wall 2 of panel bed 1. The magnitude of spills 12 depends upon the speed of the deflector and the distance it penetrates wall 2.

In principle, the direction of the deflector's motion could be upward, but downward motion is preferred. If so, there is no risk that the deflector will encounter a region of zone 7 empty of granular material. If the motion were upward, the deflector might encounter such a region, where the deflector could produce no spills from opposite fluid-entry faces.

The vertical distance between two adjacent plates 4 can be 3 inches or even greater. This is a greater distance than is possible for a panel bed design with fluid-entry face renewal by puffback or pulseback. Accordingly, the number of plates 3 and 4 in the countercurrent contacting design of FIG. 1 is much fewer than the number of such plates for a puffback or pulseback design.

Figure 2:
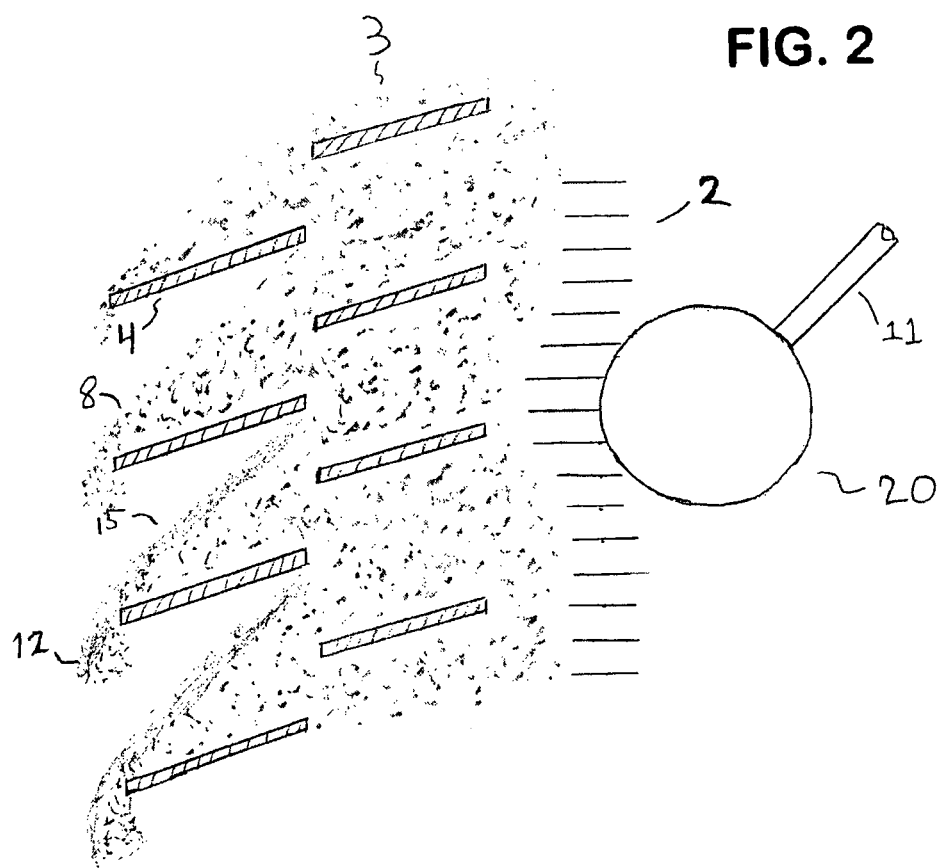
FIG. 2 illustrates a preferred deflector, comprising a horizontal roller.

FIG. 2 shows a preferred deflector, rolling tube 20. In this example, panel bed 1 is designed for fluid filtration, removing dirt or dust from a fluid, the filtration being assisted by formation of filter cakes 15. These include dirt or dust filtered from the fluid. The motion of deflector 20 causes spills 12 to occur, the spills including the filter cakes 13. In FIG. 2, plates 3 can be much shorter than the plates 3 in FIG. 1.

Figure 3:
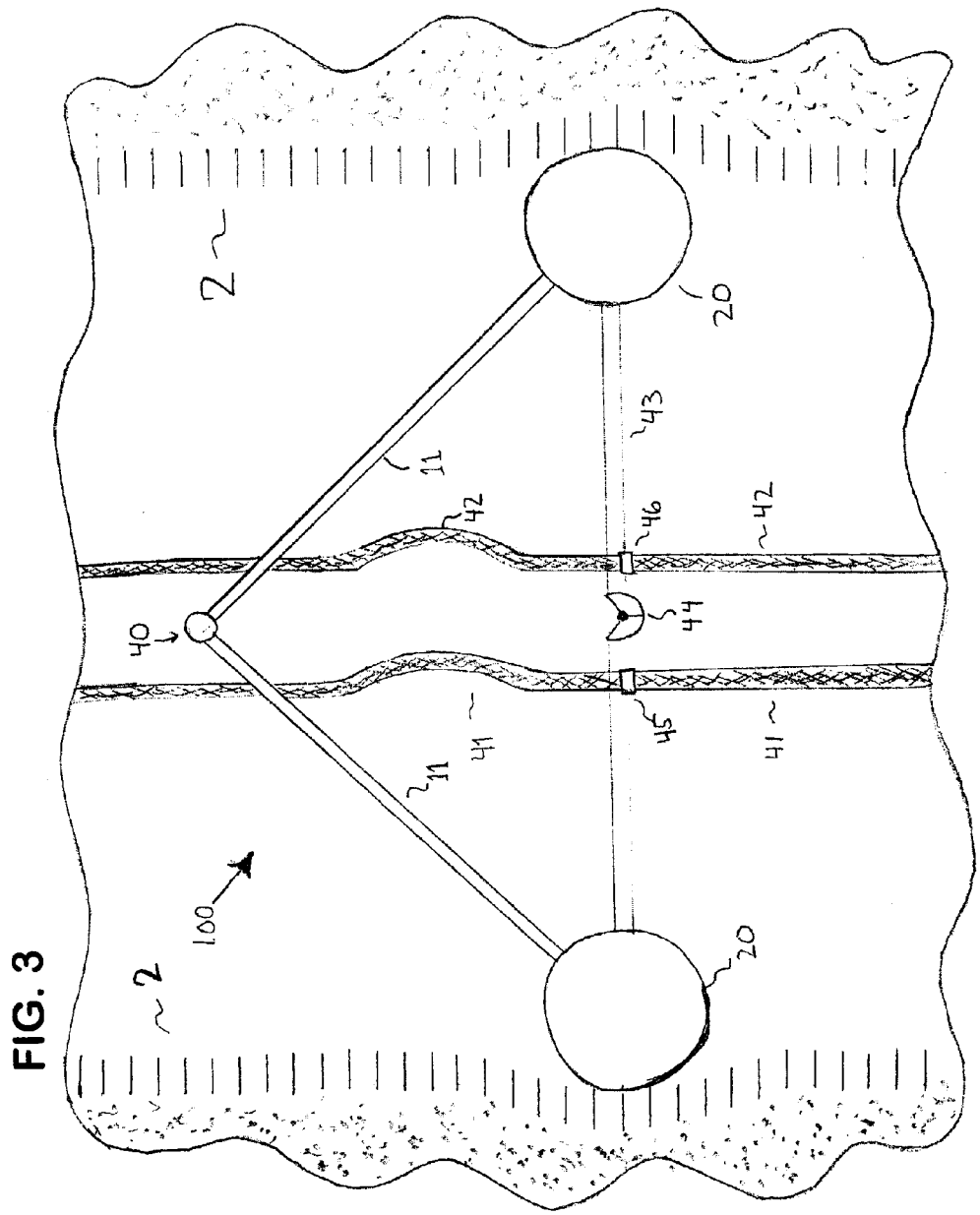
FIG. 3 illustrates, in vertical cross-section, an arrangement for renewal of fluid-entry faces of two oppositely facing panel beds.

FIG. 3 illustrates, in a vertical cross-section, an assembly of components 100, in which two rollers 20 are mounted opposite one another horizontally. Several similar assemblies 100 of components support and guide rollers 20 at intervals in a direction perpendicular to the cross-section shown in FIG. 3. Components 100 include two bars 11 pushing down on the two rollers 20. The source of the shove which causes bars 11 to push against the two rollers might appear to be the hinge 40, but in fact the source of the shove is an electric motor (see FIG. 6) pulling at a constant force upon metal chains 41 and 42. The chains are continuous loops (not evident from the drawing in FIG. 3). The electric motor pulls taut the portions of chains 41 and 42 beneath their attachments 45 and 46, respectively, to bar 43. The portions of chains 41 and 42 above the attachments are slack. The chains pull downward upon bar 43, which maintains the distance of separation of the two rollers 20.

In the assembly of components 100, bars 11 drive the two rollers 20 down fluid-exit faces 2 of two panel beds facing in opposite directions. The force exerted by bars 11 upon rollers 20 being constant, downward motion of the rollers accords with a constant combination of speed (a function of the speed of the electric motor to be seen in FIG. 6) and distance of penetration in wall 2 (a function of the length of bar 43). The combination produces body movements of granular material in the two oppositely facing panel beds, the body movements acting to produce spills at the fluid-entry faces of the two beds (not shown in FIG. 3). The constancy of the combination guarantees that the spills are uniform.

Figure 4:
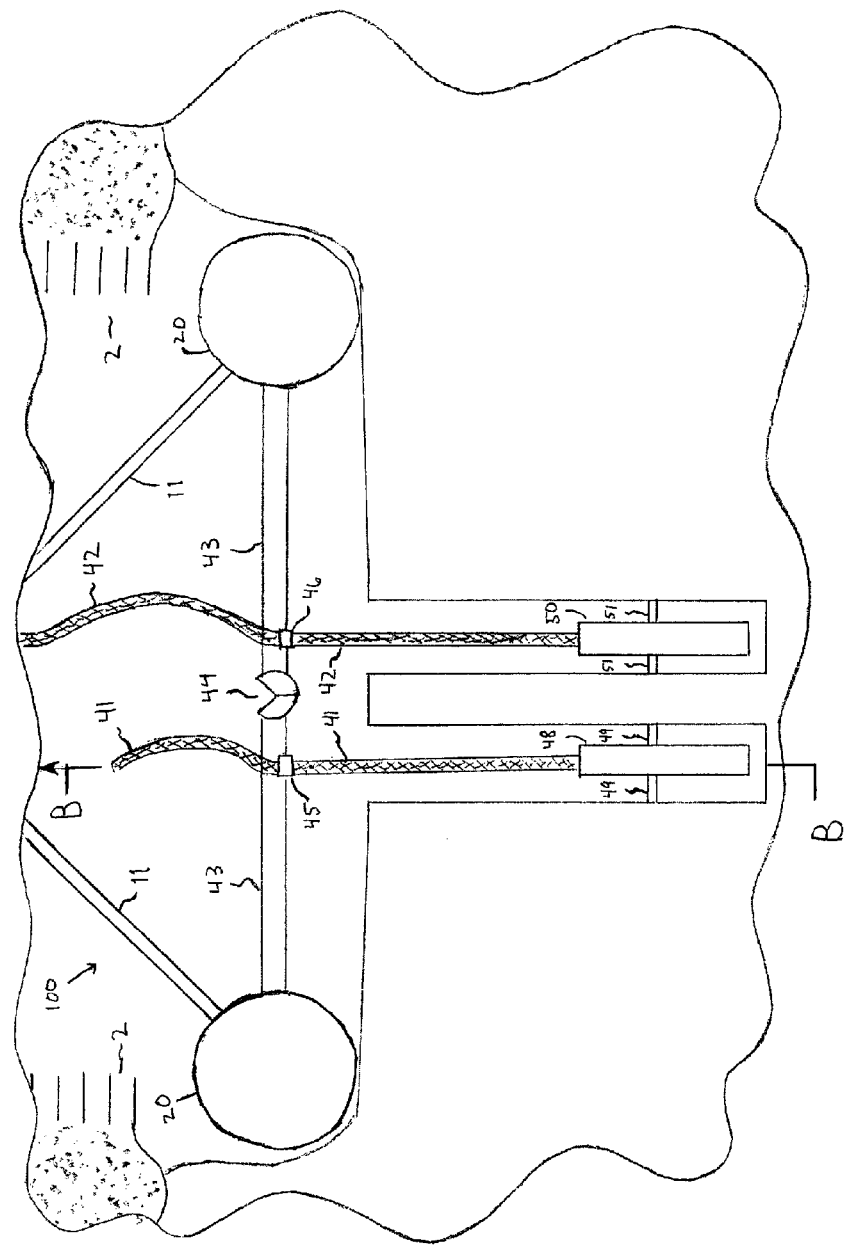
FIG. 4 shows the arrangement of FIG. 3 in repose below the two panel beds.

FIG. 4 shows arrangement 100 in repose below walls 2 of the two oppositely facing panel beds.

Figure 5:
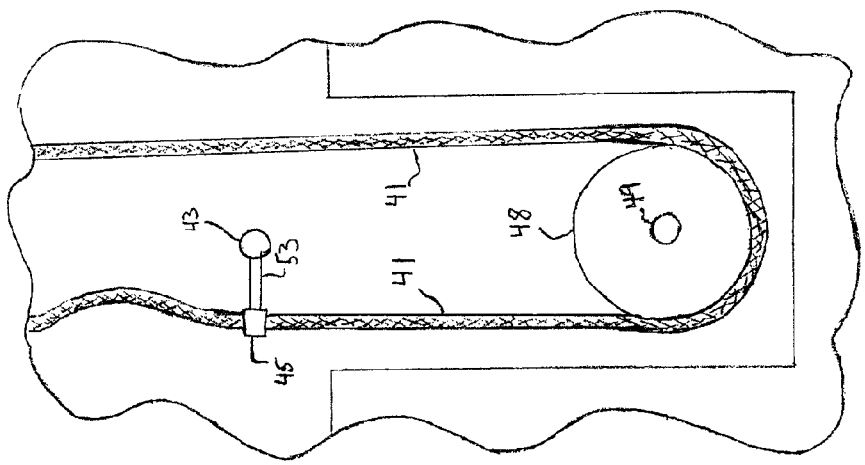
FIG. 5 is vertical cross-section B-B in FIG. 4.

FIG. 5 is section B-B in FIG. 4. Bar 53 maintains attachment 43 at some distance from attachment 45 to bar 43. There is a rotating wheel 48, with axles 49, that reverse the direction of chain 41. A similar arrangement (wheel 50 with axles 51 shown in FIG. 4) reverses the direction of chain 42.

Figure 6:
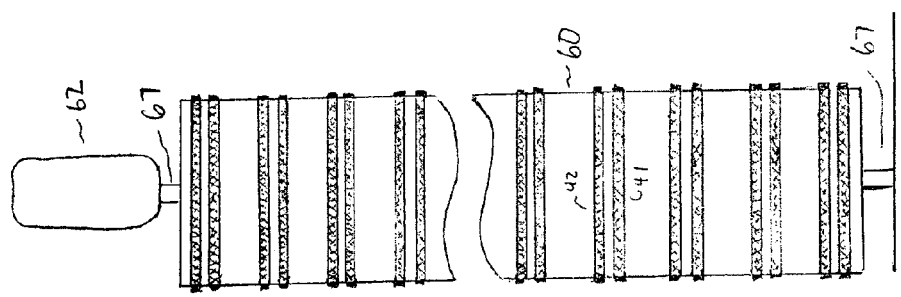
FIG. 6 is a top-down view of a drum rotated by an electric motor.

FIG. 6 is a top-down view of rotating cylinder 60, which electric motor 62 rotates on axle 61 (either clockwise or counterclockwise). Metal chains 41 and 42 pass over cylinder 60.

Figure 7:
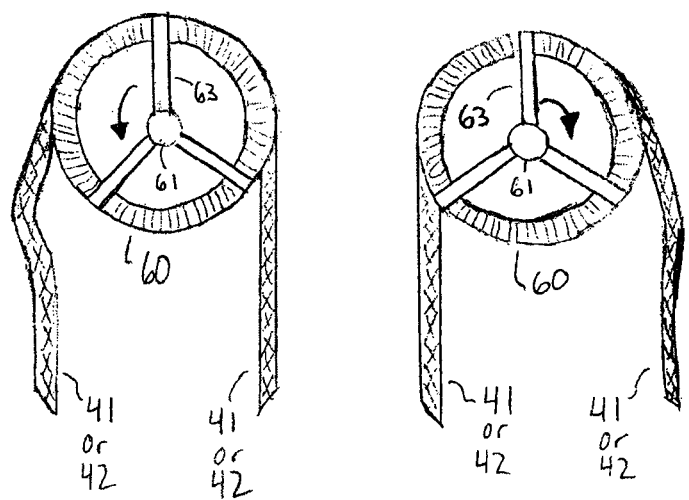
FIG. 7 shows two vertical cross-sections of the drum of FIG. 6.

FIG. 7 illustrates two vertical cross-sections of cylinder 60 over which, as shown, chains 41 and 42 pass. As seen on the right in FIG. 7, clockwise rotation of cylinder 60 pulls on chains 41 and 42 in regions commencing below their points of attachment, 45 and 46 respectively, to bar 43.

These pulls move assembly 100 of components downward. As seen on the left in FIG. 7, counterclockwise rotation of drum 60 pulls on chains 41 and 42 in the region commencing above their points of attachment, 45 and 46 respectively, to bar 43. These pulls move assembly 100 of components upward.

Figure 8:
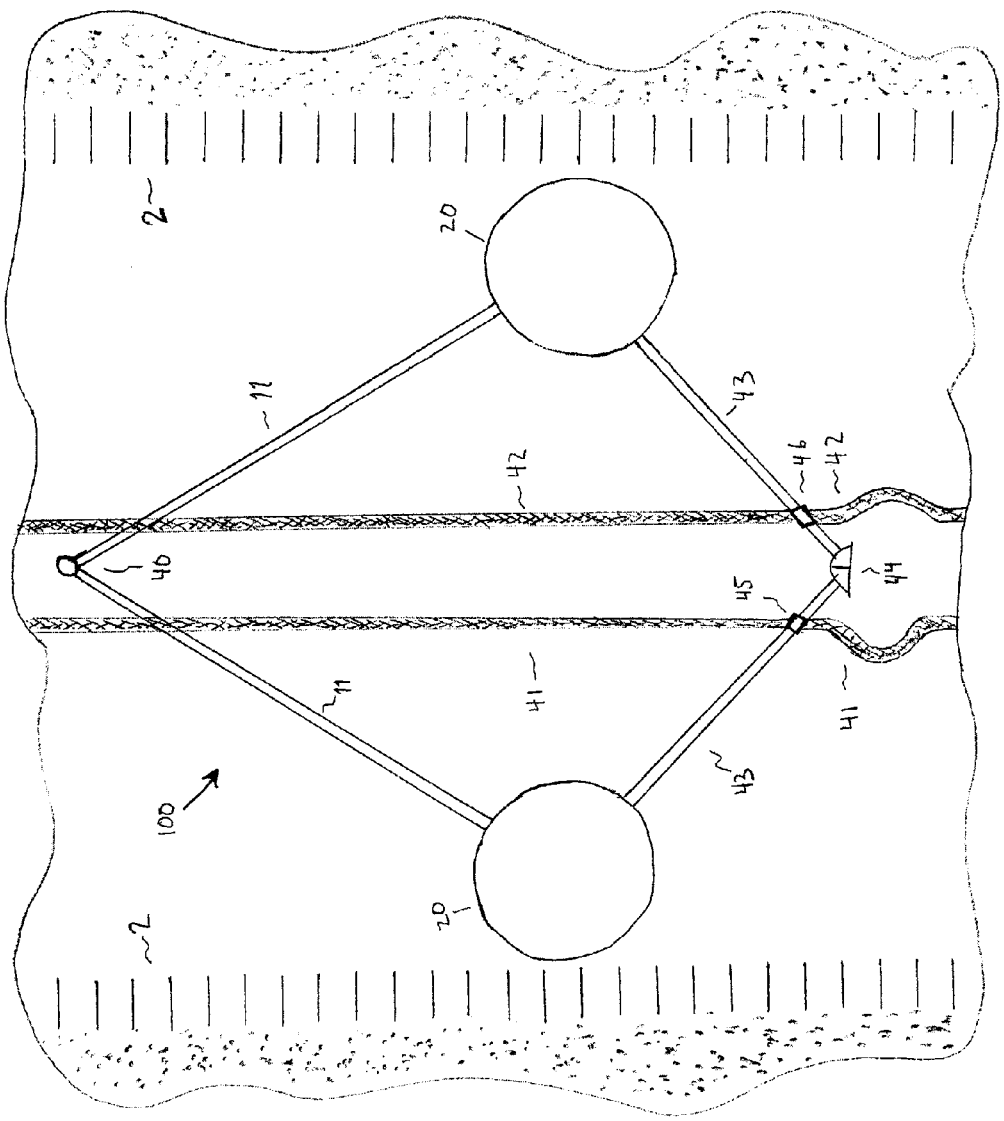
FIG. 8 shows the disposition of an assembly of components when being pulled upward in preparation for re-use (as in FIG. 3).

FIG. 8 shows the disposition of elements of arrangement 100 when the arrangement is pulled upward to an elevation permitting its re-use (as in FIG. 3). Chains 41 and 42 are taut above their attachments 45 and 46, respectively, to bar 43. Hinge 44 now allows bar 43 to bend, so that it does not touch fluid-exit faces 2 of the two oppositely facing panel beds. Chains 41 and 42 are slack below their attachments 45 and 46 to bar 43.

Figure 9:
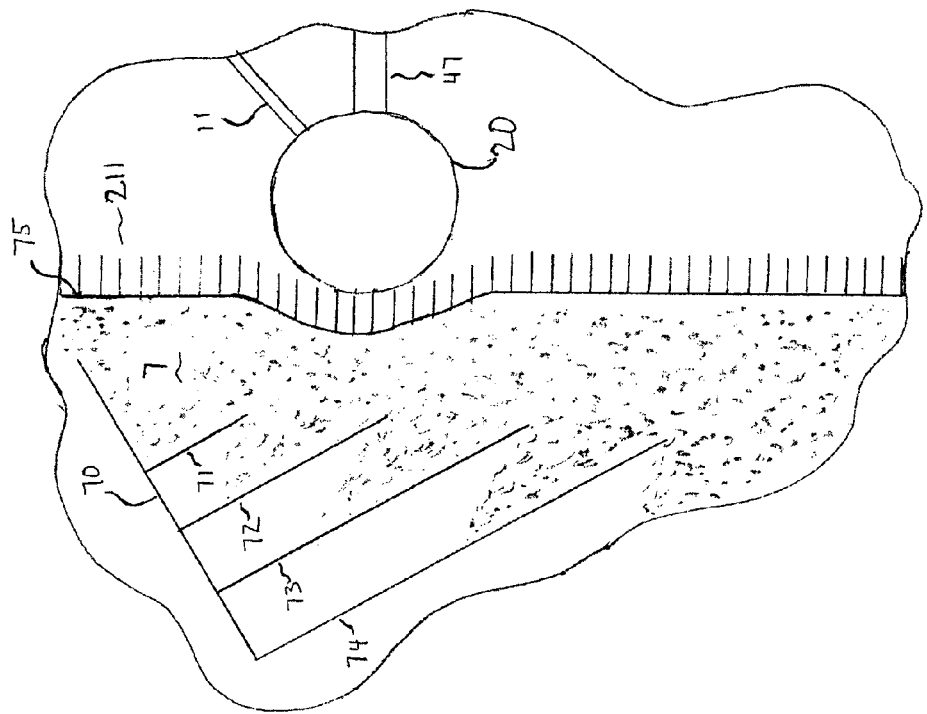
FIG. 9 illustrates behavior of the assembly of components during an interval of acceleration to the speed required for the re-use.

When the elements of arrangement 100 reach an elevation appropriate for its re-use moving downward (as in FIG. 3), motor 62 (seen in FIG. 6) reverses from counterclockwise to clockwise, and the elements of arrangement 100 move to positions as illustrated in FIG. 3. However, elements of arrangement 100 are now stationary. The arrangement must be accelerated downward to the speed necessary to produce identical spills of granular material from fluid-entry faces of the two oppositely facing panel beds. FIG. 9 illustrates behavior of a portion of arrangement 100 (roller 20, bar 47, and bar 11) in an interval of time during which arrangement 100 experiences acceleration. Roller 20 pushes against simulation 211 of wall 2. A flexible metal wall 75 separates the simulated wall 211 from space 7. Roller 20 deflects wall 75 by a distance creating (as roller 20 comes up to speed) a deflection of the wall sufficient to produce a body movement of material in space 7 toward structure 70. The body movement drives granular material into structure 70, increasing inventories of the material in spaces between plates 71, 72, 73, and 74. After roller 20 has passed structure 70, gravity moves material in these spaces downward into space 7.

An application of a panel bed face-renewal design similar to that seen in FIG. 3 would be to conduct a countercurrent exchange between an industrial water effluent, containing undesirable contaminants, and a granular medium (such as activated carbon) capable of absorbing the contaminants, so that the exchange delivers purified water to a source of drinking water (such as a river or a lake) for a community of people in the vicinity.

Another application of a panel bed face-renewal design similar to that seen in FIG. 3 would be to employ activated carbon in countercurrent contacting at about 25° C. to absorb carbon dioxide from the gaseous product of combustion of a fossil fuel. The installation would require a second countercurrent contacting panel bed at about 100° C. in which a stream of carbon dioxide desorbs the carbon dioxide absorbed in the first bed. The excess carbon dioxide in effluent from the second panel bed would be diverted for a use (such as enhancing recovery of oil from an old well) or disposal (such as absorption by coal in a coal seam too shallow for mining).

If the foregoing application deals with the product of coal combustion, a panel bed like that seen in FIG. 3 can be employed to remove fly ash from this product before it is sent to this application.

While the invention has been described with reference to specific embodiments, modifications and variations of the invention may be constructed without departing from the scope of the invention, which is defined in the following claims.

I claim:

1. A method for achieving uniformity of spills from the renewal of fluid-entry faces of a panel bed of granular material, comprising:
fixing a position of said panel bed in space,
providing the fluid-entry faces along the panel bed,
providing a generally horizontally deflecting flexible fluid-exit wall spaced from the fluid-entry faces,
providing a movable deflector adjacent to the fluid-exit wall,
providing a constant push on the deflector thereby contacting and displacing the fluid-exit wall of said panel bed, said constant push causing a motion of said deflector to occur at a constant combination of speed and displacement of said fluid-exit wall toward said fluid-entry faces, said constant combination causing body movement of said granular material toward said fluid-entry faces, thereby causing said spills of said granular material to occur from said fluid-entry faces, renewing said fluid-entry faces, said constant combination in said motion of said deflector guaranteeing that said spills are uniform.

2. The method of claim 1, in which said motion of said deflector is downward.

3. The method of claim 1, in which said deflector is a shallowly bent metal plate, its convex side pressing against said fluid-exit wall of said panel bed.

4. The method of claim 1, in which said deflector is a horizontal rolling cylinder.

5. A method for achieving uniformity of spills from the renewal of fluid-entry faces of a panel bed of granular material, comprising:
fixing the position of said panel bed in space,
providing the fluid-entry faces along the panel bed,
providing a generally horizontally deflecting flexible fluid-exit wall spaced from the fluid-entry faces,
providing a movable deflector adjacent to the fluid-exit wall,
providing a constant push downward on the deflector thereby contacting and displacing the fluid-exit wall of said panel bed towards the fluid-entry faces, said deflector being a downwardly moving horizontal rolling cylinder,
said constant push causing a motion of said deflector to occur at a constant combination of speed and displacement of said fluid-exit wall toward said fluid-entry faces, said constant combination causing body movement of said granular material toward said fluid-entry faces, thereby causing the spills of said granular material to occur from said fluid-entry faces, renewing said fluid-entry faces, said constant combination in said motion of said deflector guaranteeing that said spills are uniform.

6. The method of claim 5, in which the vertical distance between two neighboring plates supporting said fluid-entry faces is not less than 3 inches.

7. Apparatus for achieving uniformity of spills from the renewal of fluid-entry faces of a panel bed of granular material, comprising:
a horizontal cylinder,
a first set of rods fixing the position of said panel bed in space,
the fluid-entry faces disposed along the panel bed,
a generally horizontally deflecting flexible fluid-exit wall spaced from the fluid-entry faces,
a movable deflector adjacent to the fluid-exit wall,
a second set of rods,
a source of a constant downward push on each rod of said second set of rods, said constant downward push moving said horizontal cylinder downward in contact with the fluid-exit wall of said panel bed and displacing the fluid-exit wall towards the fluid-entry faces, thereby causing said horizontal cylinder to assume the role of a cylinder deflector, said constant downward push on each said rod of said second set of rods causing said downward push of said cylinder deflector to occur at a constant combination of speed and displacement of said fluid-exit wall toward said fluid-entry faces, said constant downward push being sufficiently strong so that said constant combination causes body movement of said granular material in the direction of said fluid-entry faces, thereby causing said spills of said granular material to occur from said fluid-entry faces, renewing said fluid-entry faces, said constant combination in said cylinder deflector's motion guaranteeing that said spills are uniform.

8. Apparatus comprising a panel bed for granular material having:
fluid entry faces,
a flexible fluid exit wall spaced from the fluid entry faces, and
deflector adjacent to the fluid exit wall,
a movable deflector in contact with the fluid exit wall displaceable towards the fluid entry faces for pushing the granular material in the panel bed in a direction of the fluid entry faces and for causing spills of the granular material from the fluid entry faces and renewing the fluid entry faces with the granular material.

9. The apparatus of claim 8, wherein the panel bed further comprises a plurality of fluid entry face supporting plates supporting the fluid entry faces.

10. The apparatus of claim 9, further comprising a support zone between the plurality of fluid entry face supporting plates and the fluid exit wall, and wherein the support zone is adapted for supplying the granular material to the fluid entry faces and for passing counter current fluid through the support zone and the granular material in the support zone to the fluid exit wall.

11. The apparatus of claim 10, further comprising plural support zone plates in the support zone and parallel to the plurality of fluid entry face supporting plates and spaced vertically from the plurality of fluid entry face supporting plates.

12. The apparatus of claim 11, further comprising a supply zone between the support zone and the fluid exit wall and adapted for flowing the granular material from the supply zone to the support zone.

13. The apparatus of claim 12, wherein the deflector pushes the fluid exit wall into the supply zone and toward the support zone.

14. The apparatus of claim 8, wherein the deflector pushes the fluid exit wall in a direction toward the fluid entry faces.

15. The apparatus of claim 14, wherein the fluid exit wall has gratings.

16. The apparatus of claim 15, wherein the gratings in the fluid exit wall are spaced apart up to six times a diameter of smallest particles within the panel bed.

17. The apparatus of claim 15, wherein the deflector moves downward when pushing the granular material.

18. The apparatus of claim 17, wherein the deflector comprises a bent metal plate.

19. The apparatus of claim 17, wherein the deflector comprises a horizontal rolling cylinder.

20. The apparatus of claim 17, further comprising another panel bed oppositely oriented to the panel bed having a second fluid exit wall oppositely oriented to the fluid exit walls, and wherein the deflector comprises two rolling cylinders, adapted for pressing outward from each other when moving downward along the opposite fluid exit walls and for moving inward toward each other when moving upward before moving downwards again.

* * * * *